US005748717A

United States Patent [19]
Chan et al.

[11] Patent Number: 5,748,717
[45] Date of Patent: May 5, 1998

[54] METHOD AND SYSTEM FOR ASSIGNING A COMMUNICATION TO A PREFERRED CARRIER FOR ACCOUNTING AND/OR COMMUNICATION ROUTING PURPOSES

[75] Inventors: Jim H. Chan, Roswell; Nailesh B. Desai, Norcross, both of Ga.

[73] Assignee: BellSouth Corporation, Atlanta, Ga.

[21] Appl. No.: 684,450

[22] Filed: Jul. 19, 1996

[51] Int. Cl.$^6$ .................... H04M 15/00; H04M 15/06
[52] U.S. Cl. .................... 379/120; 379/119; 379/115; 379/207; 379/230
[58] Field of Search .................... 379/112, 114, 379/115, 116, 119, 121, 126, 127, 201, 207, 220, 229, 230

[56] References Cited

U.S. PATENT DOCUMENTS

| | | | |
|---|---|---|---|
| 5,515,425 | 5/1996 | Penzias et al. | 379/114 |
| 5,570,417 | 10/1996 | Byers | 379/114 |
| 5,610,977 | 3/1997 | Williams et al. | 379/230 |

*Primary Examiner*—Huyen Le
*Assistant Examiner*—Paul Loomis
*Attorney, Agent, or Firm*—Jones & Askew, LLP

[57] ABSTRACT

A method and system 11 for quickly changing a subscriber's long distance or local carrier while allowing the subscriber to maintain the same directory number. A preferred carrier code is entered into an interim carrier database 42, 43, and an indicator is activated for communications originating on the subscriber's line 14a. When a communication originating on the subscriber's line 14a is subsequently received, the carrier-of-record code is retrieved from a subscriber database 44, and the preferred carrier code is retrieved from the interim carrier database 42, 43. The preferred carrier code is compared to the carrier-of-record code. If the preferred carrier code is different than the carrier-of-record code, the preferred carrier code is used to assign the communication to the preferred carrier. At a later time, the carrier-of-record code in the subscriber database 44 is updated with the subscriber's preferred carrier code. When it is determined that the subscriber's carrier-of-record code is the same as the preferred carrier code, the indicator for the subscriber's line is removed. Once the indicator is removed, the interim carrier database 42, 43 is no longer referenced in the course of routing communications originating on the subscriber's line 14a, and the subscriber's preferred carrier code may be deleted from the interim carrier database 42, 43.

12 Claims, 7 Drawing Sheets

METHOD AND SYSTEM FOR ASSIGNING A COMMUNICATION TO A PREFERRED CARRIER FOR ACCOUNTING AND/OR COMMUNICATION ROUTING PURPOSES

TECHNICAL FIELD

The present invention relates generally to telecommunications systems, and more particularly, relates to a method and system for assigning a communication to a preferred carrier for accounting and/or communication routing purposes.

BACKGROUND OF THE INVENTION

Patrick Henry said, "Give me liberty or give me death!" Although most people are not quite as passionate about their telephone service, they do value the ability to select a preferred carrier. The freedom to choose among a variety of long distance carriers has become an important aspect of modem telephone service. In fact, long distance telephone service is an intensely competitive industry. Several long distance carriers compete vigorously for subscribers by advertising extensively and offering a wide variety of calling plans and incentives. Large-scale direct mail and telemarketing programs are used to encourage telephone service subscribers to switch long distance carriers. These efforts appear to be quite effective, as thousands of subscribers change their long distance carriers every year. No doubt, many subscribers have changed long distance carriers, and then changed again, and again.

A subscriber's long distance communications are typically assigned to the subscriber's preferred long distance carrier in a central office switch that serves as a gateway between the subscriber's line and the telephone network. When a calling party picks up a telephone on a subscriber's line and dials a directory number, the subscriber's line carries the communication to a central office switch that services the subscriber's line. The central office switch interprets the digits dialed by the calling party and routes the communication to a terminating station, such as a telephone associated with the dialed directory number. The central office switch thus serves as a gateway between the subscriber's line and the local exchange carrier's local exchange network. The central office switch also serves as a gateway between the subscriber's line and a plurality of long distance networks operated by a plurality of long distance carriers.

The assignment of communications originating on a subscriber's line to the subscriber's preferred long distance carrier causes these communications to be routed through the long distance network operated by the preferred long distance carrier. More specifically, when the central office switch receives a long distance communication originating on the subscriber's line, the central office switch retrieves the subscriber's long distance carrier-of-record code from a database maintained at the central office switch. The central office switch responds to the subscriber's long distance carrier-of-record code by physically routing the communication through the long distance network operated by the long distance carrier-of-record. A subscriber typically selects a long distance carrier-of-record when initiating service, and may change its long distance carrier-of-record from time to time through long distance carrier change requests.

The central office switch also creates an accounting record for the communication. This accounting record includes the originating station's directory number, the terminating station's directory number, and the long distance carrier code for the communication. The accounting records created by the central office switch are periodically downloaded to a billing system that generates monthly telephone bills, including local as well as long distance telephone charges. The local exchange carrier then collects the subscriber's payment and forwards the long distance portion of the payment to the subscriber's long distance carrier.

The subscriber's long distance carrier is conventionally changed by altering the subscriber's long distance carrier code in the subscriber database maintained at the central office switch that services the subscriber's line. Access to the central office switch is generally restricted, however, because the central office switch contains important billing and communication routing information. In fact, the subscriber database of a typical central office switch can only be altered by running a special program on the central office switch. Running this program may require that an attendant be physically present at the central office switch. But many central office switches are not attended on a full-time basis. Changing a subscriber's long distance carrier code may therefore require that a service technician travel to the central office switch to run the program required to update the subscriber database.

Implementing a particular change to a subscriber database, such as changing a subscriber's long distance carrier, often takes a significant amount of time. A typical local exchange carrier operates several central office switches and receives long distance carrier change requests at a central location, such as an interexchange carrier service center. These long distance change requests are usually logged, and mechanized work orders are written, at the an interexchange carrier service center. A service technician eventually picks up the mechanized work orders and provisions the various central office switches to implement the changes to the subscriber databases. Completing this process to change a subscriber's long distance carrier typically takes from two to five working days.

This delay in implementing a change to a subscriber's long distance carrier causes the newly-assigned long distance carrier to lose revenue during the period of the delay. The subscriber also loses the benefit of the newly-assigned long distance carrier's service, which may include a promotional discount or other benefit, during the period of the delay. As thousands of consumers change their long distance carriers annually, the combined effect of these delays on long distance carriers, and their subscribers, is significant. There is, therefore, a need for more quickly assigning a long distance communication to a preferred long distance carrier for accounting and communication routing purposes.

Although this need is present in the intensely competitive long distance telephone service market, the need is not present in the local telephone service market because local telephone service presently remains a single-provider system. But competition is expected to soon develop in local telephone service markets. In a competitive local telephone service market, most subscribers will continue to be connected to only a single local exchange network. Competition will arise, however, because local exchange carriers are expected to begin selling wholesale access to their local exchange networks. This wholesale access will create a resale market for local telephone service that will allow new entities—resale service providers—to enter local telephone service markets. These resale service providers will provide individual subscribers with alternative local exchange carriers, just as individual subscribers now have alternative long distance carriers.

It is believed that a typical subscriber would be reluctant, or outright unwilling, to change its local exchange carrier if the subscriber also had to change its directory number as a consequence. Allowing a subscriber to switch to a different local exchange carrier and retain the same directory number is known as "local number portability." Local number portability is generally considered to be an important aspect of effective competition in local telephone service markets. Local number portability could be provided in a manner similar to that presently used to provide subscribers with selectable long distance carriers. That is, a local exchange carrier code for each subscriber could be maintained in a subscriber database at the appropriate central office switch. This local exchange carrier code could be included in accounting records created by the central office switch for local communications. These local communication accounting records could be periodically downloaded to the billing system, which could create monthly telephone bills. The operator of the local exchange network could then collect a subscriber's payment and forward the local portion of the payment to the subscriber's local carrier.

This method of providing local number portability, however, would suffer from the same disadvantage presently experienced in providing selectable long distance carriers. Namely, a significant delay would be incurred when changing subscribers' local exchange carriers, as service technicians would generally have to travel to the various central office switches to implement the changes. There is, therefore, a need for a method and system for quickly assigning a local communication to a resale service provider while allowing the subscriber to retain its directory number.

In sum, there is a need for a method and system for quickly assigning a long distance communication to a preferred long distance carrier for accounting and communication routing purposes. There is a further need for a method and system for quickly assigning a local communication to a resale service provider for accounting purposes. In particular, there is a need for local number portability including a method and system for quickly assigning a subscriber's local communications to a resale service provider for accounting purposes while allowing the subscriber to retain its directory number.

SUMMARY OF THE INVENTION

The present invention meets the above-described needs by providing a method and system for changing a subscriber's long distance or local carrier in response to a carrier change request. In conventional telecommunications systems, a substantial delay is experienced in implementing a carrier change request. This delay in implementing a carrier change request causes the newly-assigned long distance carrier to lose revenue during the period of the delay. The subscriber also loses the benefit of the newly-assigned long distance carrier's service, which may include a promotional discount or other benefit, during the period of the delay. Advantageously, the present invention provides a method and system for quickly changing an subscriber's long distance or local carrier so as to avoid a substantial delay in implementing a carrier change request.

Generally described, the present invention provides, in an intelligent switched telecommunications network, a method for attributing a communication to a preferred carrier for accounting purposes. According to this method, a communication is received on a subscriber's line. In response to receiving the communication, a carrier-of-record code associated with the subscriber's line is obtained. A preferred carrier code associated with the subscriber's line is also obtained. The carrier-of-record code is then compared with the preferred carrier code to obtain a comparison result. This comparison result indicates either that the preferred carrier is the same as a carrier-of-record associated with the carrier-of-record code, or that the preferred carrier is a carrier associated with the preferred carrier code. Based on the comparison result, an accounting record is created to attribute the communication to the preferred carrier. These steps are repeated for each communication received on the subscriber's line. In addition, the communication may be routed to a terminating station through a communications network associated with the preferred carrier.

According to another aspect of the present invention, the above-described method may be implemented, except that an accounting record need not be created to attribute the communication to the preferred carrier. For this aspect of the invention, the communication is necessarily routed to a terminating station through a communications network associated with the preferred carrier.

According to another aspect of the present invention, the above-described method may be implemented along with additional steps. Specifically, a carrier change request is received. The carrier change request indicates a change in a subscriber's choice of the preferred carrier with respect to telecommunication services on a subscriber's line. A preferred carrier code associated with the subscriber's line is entered into an interim carrier database. The preferred carrier code corresponds to the subscriber's choice of the preferred carrier. In response to entering the preferred carrier code into the interim carrier database, an indicator is activated with respect to the subscriber's line. The indicator indicates that a query of the interim carrier database is required in response to a communication received on the subscriber's line. A comparison result is subsequently determined to be a same code result when the carrier-of-record code is the same as the preferred carrier code. In response to this same code result, subsequently received communications are attributed to the preferred carrier without querying the interim carrier database.

The present invention also provides, in an intelligent switched telecommunications network, a system for attributing a communication on a subscriber's line to a preferred carrier for accounting purposes. The system includes an interim carrier database including a preferred carrier code associated with the subscriber's line. The system also includes a network element, functionally connected to the interim carrier database, that is operative to receive a communication on the subscriber's line. The network element includes a carrier-of-record code associated with the subscriber's line, and an indicator also associated with the subscriber's line. The indicator indicates that, in response to receipt of the communication on the subscriber's line, a comparison must be made between the preferred carrier code and the carrier-of-record code for a comparison result. The network element also includes an attributor for attributing the communication to the preferred carrier for accounting purposes based on the comparison result. The system also includes a comparator functionally connected to the interim carrier database and/or to the network element. The comparator is operative to make a comparison between the preferred carrier code and the carrier-of-record code for the comparison result. The comparison result is either a same code result or a different code result. The comparison result is the same code result when the carrier-of-record code is the same as the preferred carrier code. The same code result indicates that the preferred carrier is a carrier-of-record associated with the carrier-of-record code. The comparison result is the different code result when the carrier-of-record code is different from the preferred carrier code. The different code result indicates that the preferred carrier is a carrier associated with the preferred carrier code. The comparator is also operative to provide the comparison result to the network element. In addition, the network element may also be operative to route the communication to a terminating station through a communications network associated with the preferred carrier based on the comparison result.

It is therefore an object of the invention to provide a method and system for assigning a long distance communication to a preferred long distance carrier for accounting and communication routing purposes.

It is another object of the invention to provide a method and system for assigning a local communication to a resale service provider for accounting purposes.

It is another object of the invention to provide local number portability including a method and system for assigning a subscriber's local communications to a resale service provider for accounting purposes while allowing the subscriber to retain its directory number.

That the present invention improves over the drawbacks of the prior art and accomplishes the objects of the invention will become apparent from the detailed description of the preferred embodiment to follow.

DETAILED DESCRIPTION OF THE PREFERRED EMBODIMENTS

Figure 1:
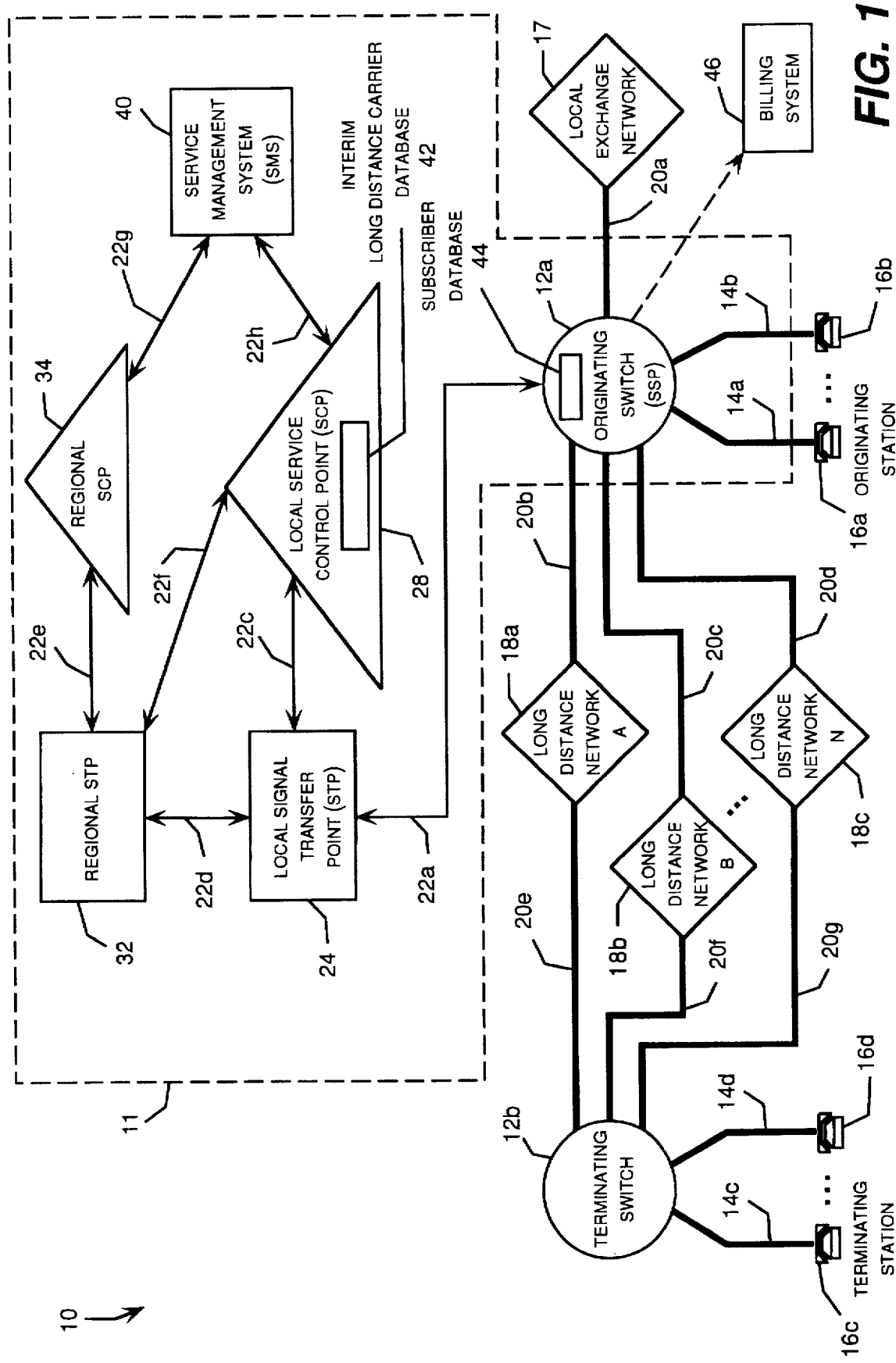
FIG. 1 is a functional block diagram of an intelligent switched telecommunications network for use in connection with a first preferred embodiment of the present invention.
Figure 2:
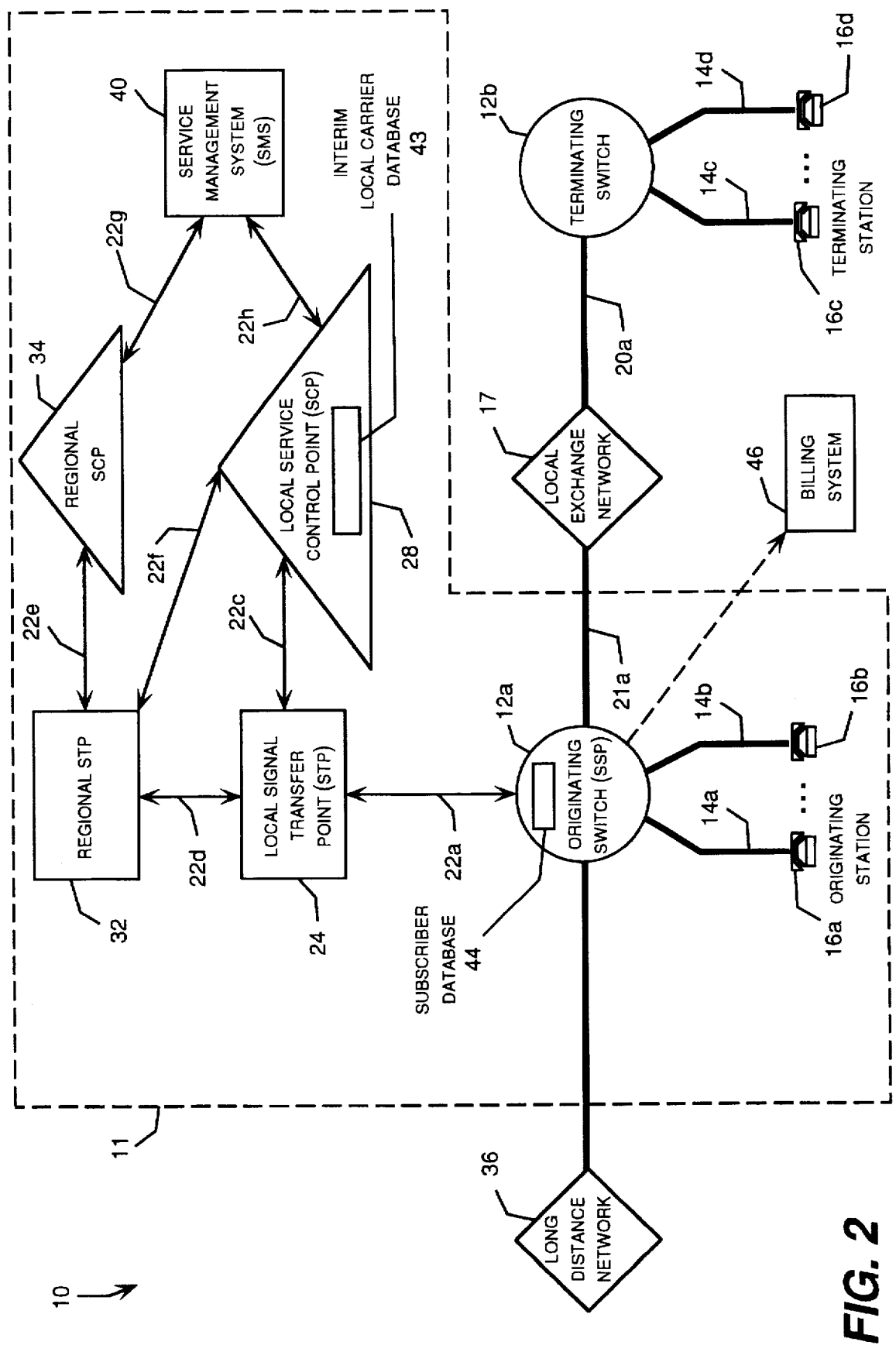
FIG. 2 is a functional block diagram of an intelligent switched telecommunications network for use in connection with a second preferred embodiment of the present invention.
Figure 3:
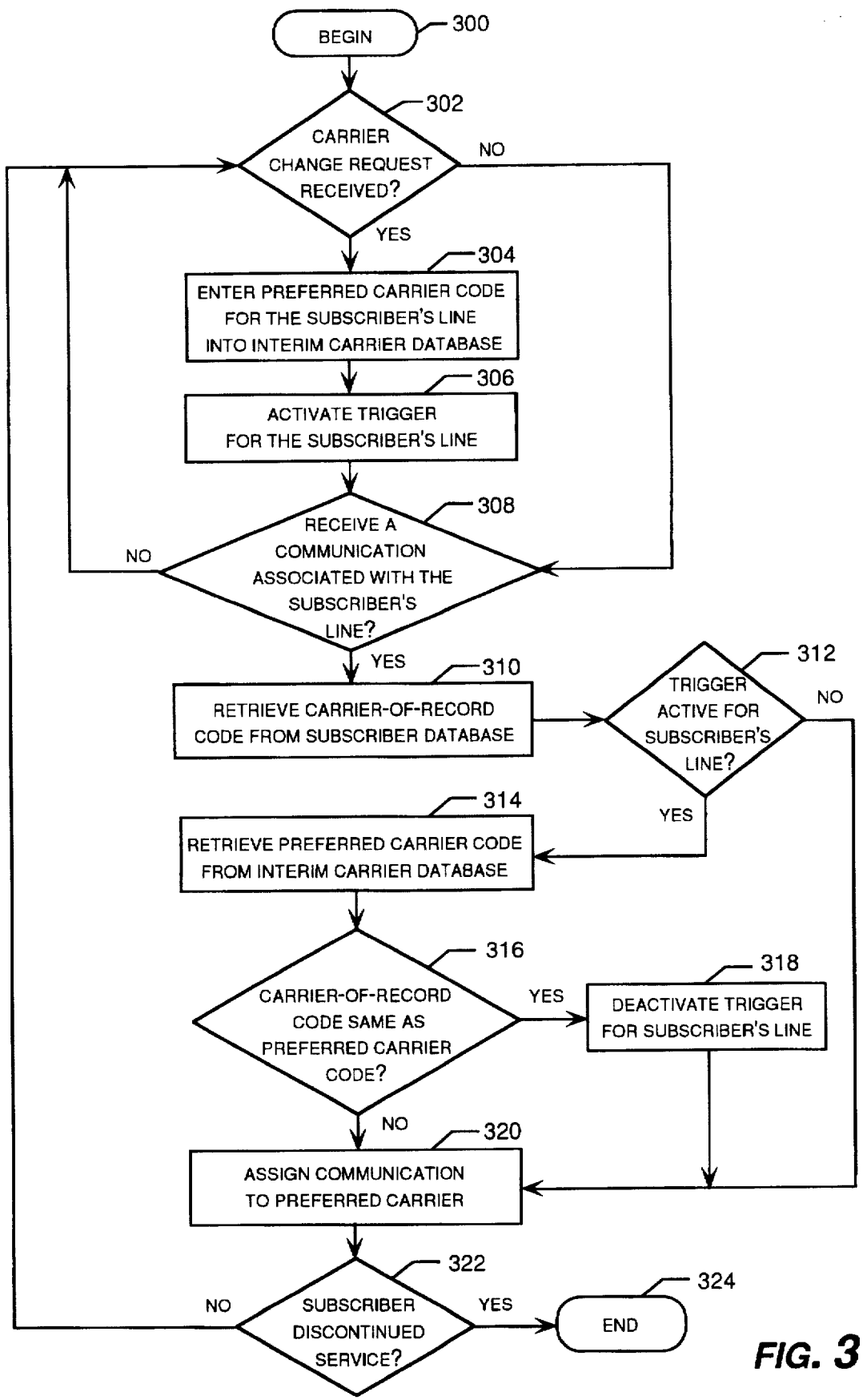
FIG. 3 is a logic flow diagram that illustrates a method for changing a subscriber's local exchange or long distance carrier.
Figure 4:
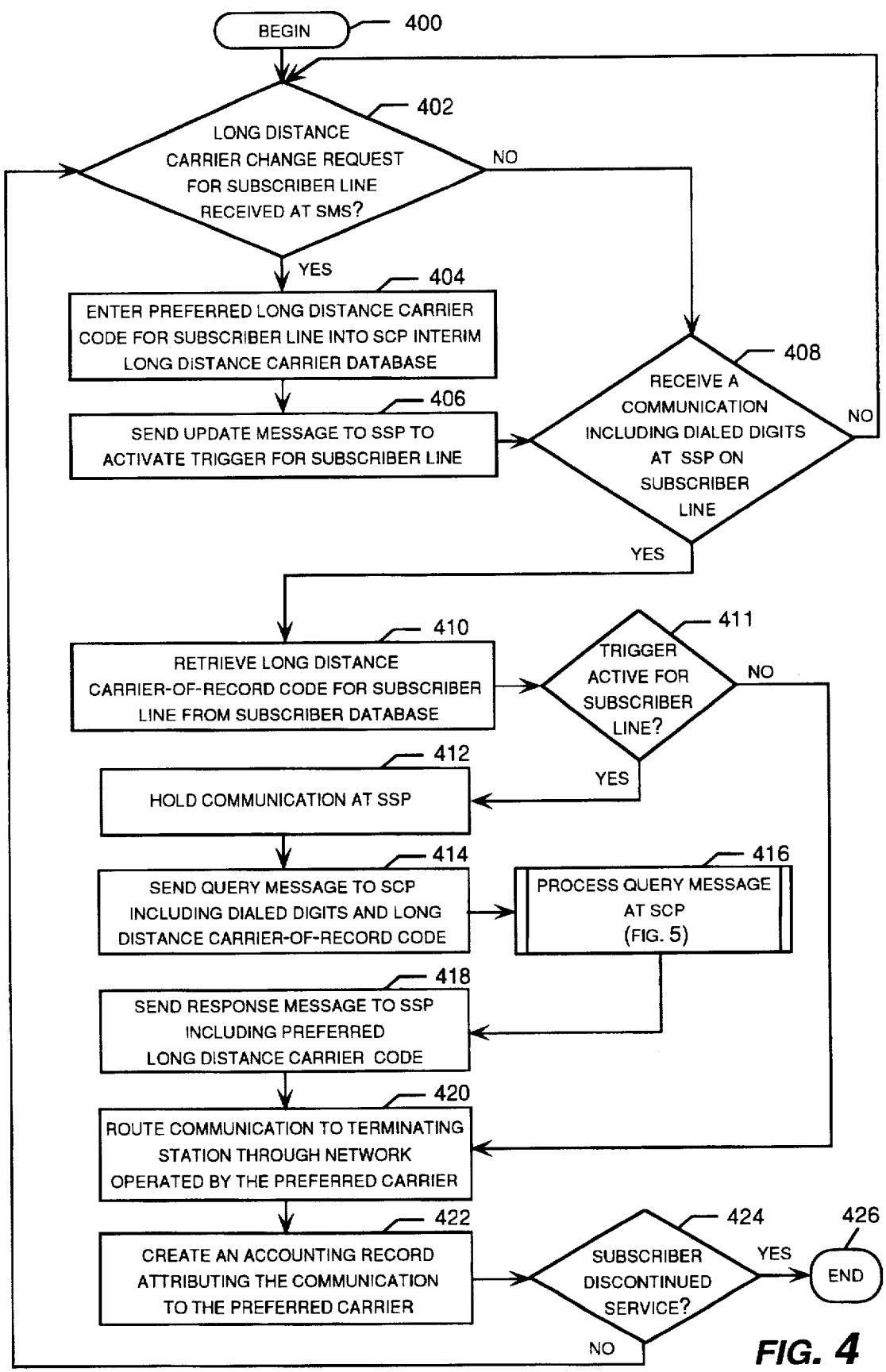
FIG. 4 is a logic flow diagram that illustrates a preferred method for changing a subscriber's long distance carrier.
Figure 5:
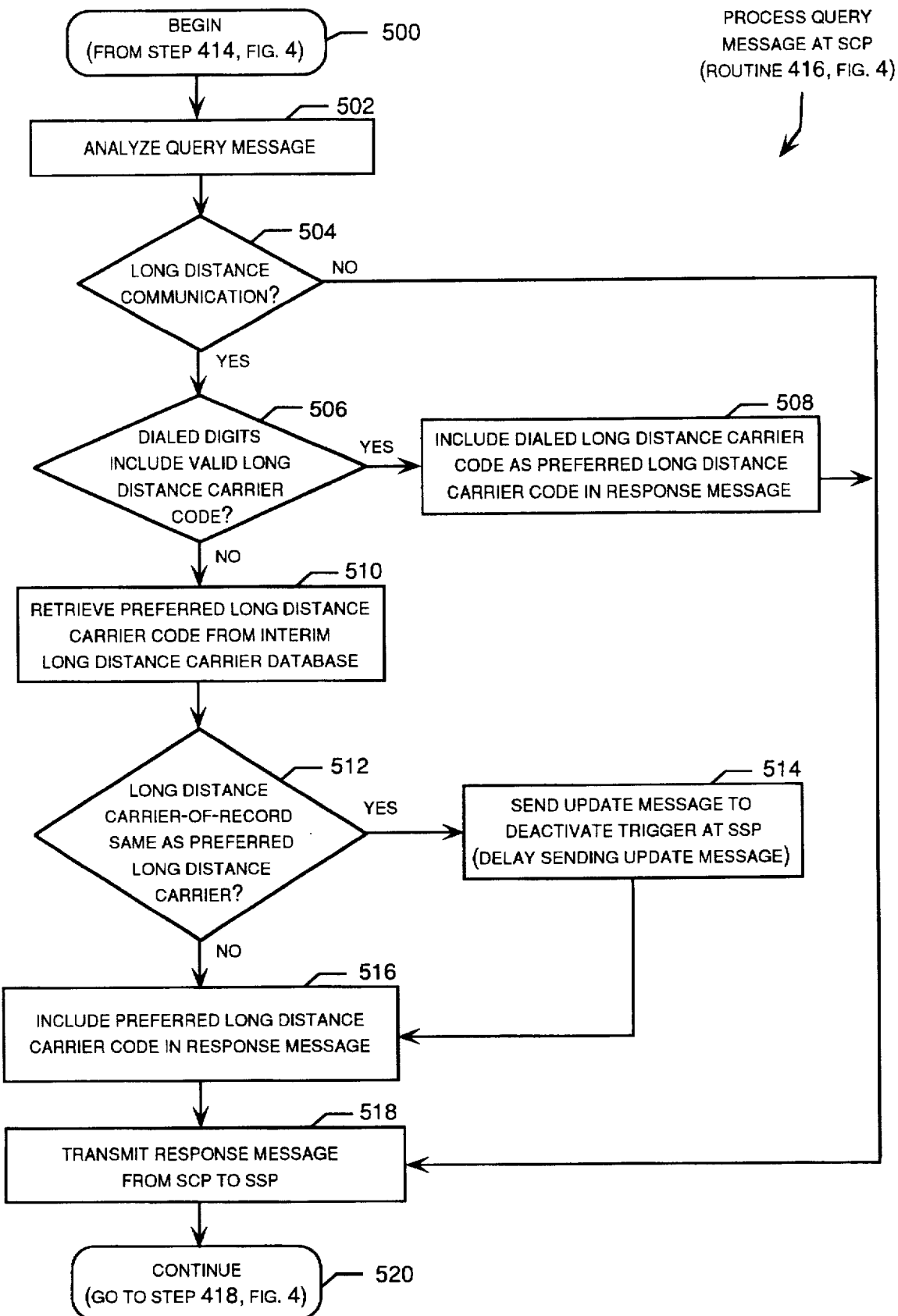
FIG. 5 is a logic flow diagram that illustrates a preferred method for processing a query message associated with changing a subscriber's long distance carrier.
Figure 6:
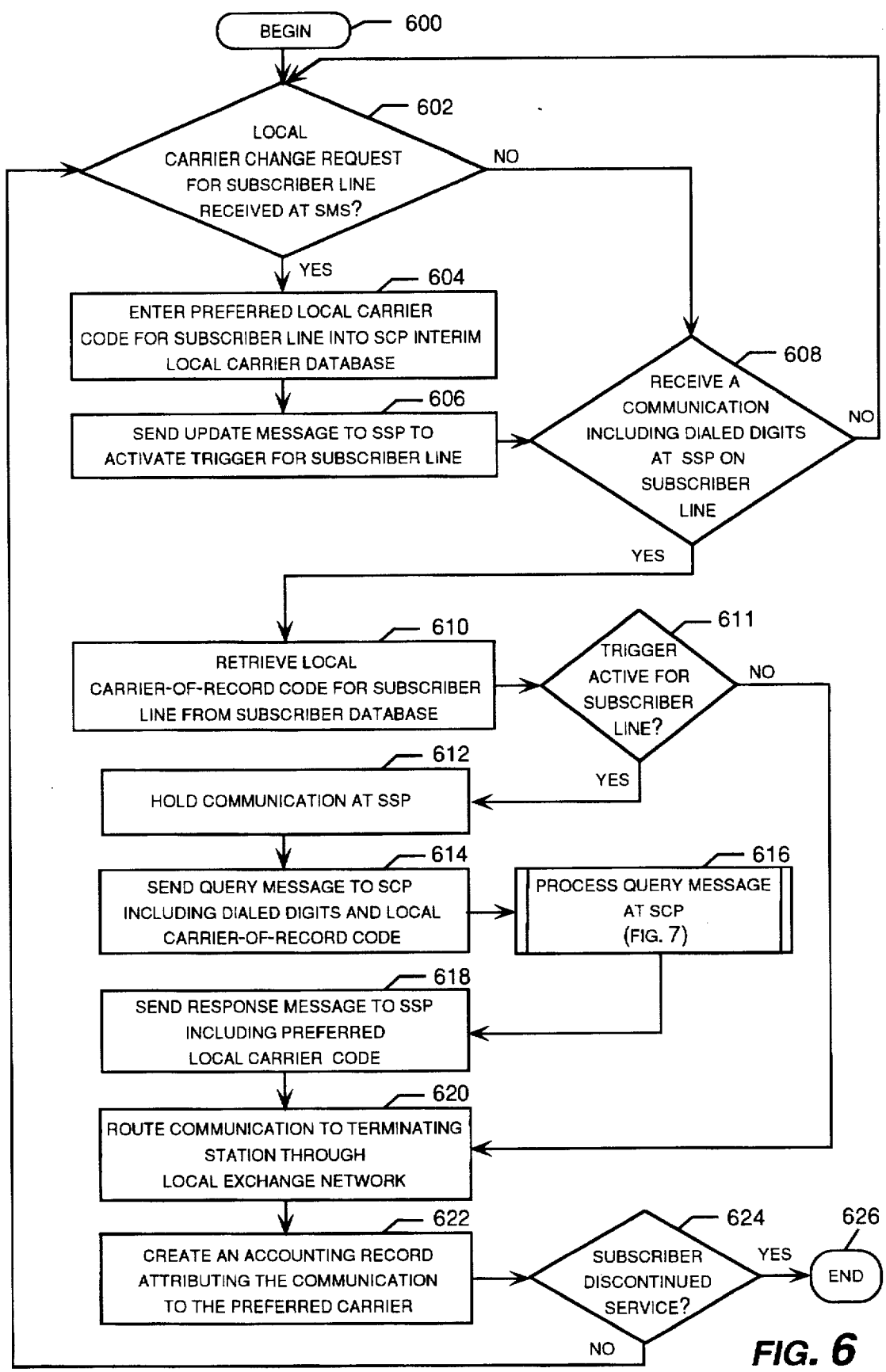
FIG. 6 is a logic flow diagram that illustrates a preferred method for changing a subscriber's local exchange carrier.
Figure 7:
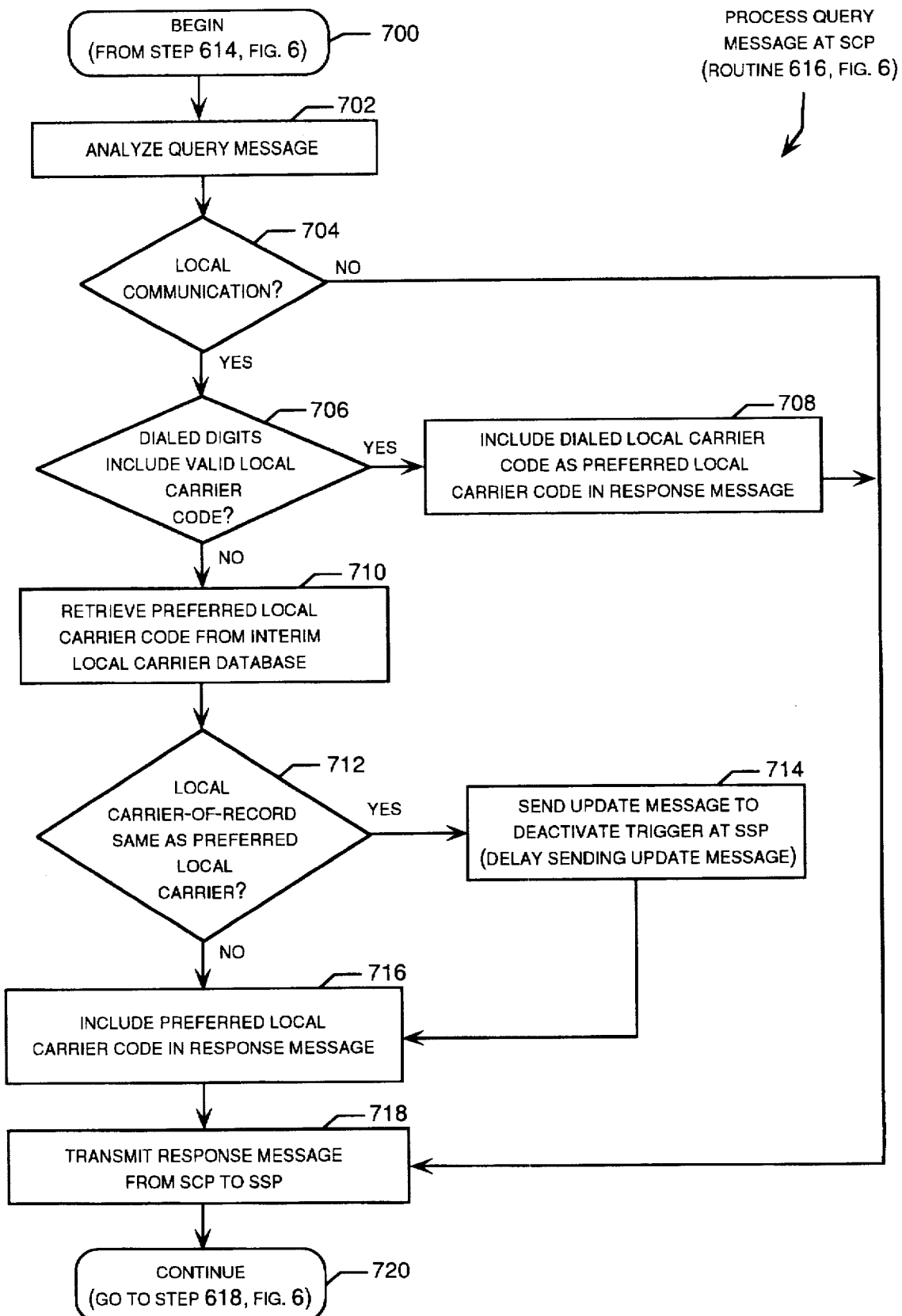
FIG. 7 is a logic flow diagram that illustrates a preferred method for processing a query message associated with changing a subscriber's local exchange carrier.

Referring now to the drawings, in which like numerals indicate like elements throughout the several figures, the preferred embodiments of the present invention will be described below with reference to the appended drawings. Generally, FIG. 1 illustrates the operating environment of a first preferred embodiment of the present invention, in which a long distance communication is assigned to a preferred long distance carrier for accounting and communication routing purposes. FIG. 2 illustrates the operating environment of a second preferred embodiment of the present invention, in which a local communication is assigned to a preferred local exchange carrier, such as a resale service provider, for accounting purposes. The second preferred embodiment provides a method and system for implementing local number portability. FIG. 3 illustrates a generally-described method for changing a subscriber's local exchange or long distance carrier. The methods illustrated by FIGS. 4–5 are adapted for implementation within the environment illustrated by FIG. 1 to provide a preferred method for changing a subscriber's long distance carrier. Similarly, the methods illustrated by FIGS. 6–7 are adapted for implementation within the environment illustrated by FIG. 2 to provide a preferred method for changing a subscriber's local exchange carrier.

THE OPERATING ENVIRONMENT OF THE PREFERRED EMBODIMENTS

FIG. 1 is a functional block diagram of an intelligent switched telecommunications network for use in connection with a first preferred embodiment of the present invention. FIG. 1 illustrates a portion of a public switched telecommunications network (PSTN) 10 including an Advanced Intelligent Network (AIN) 11 of a typical local exchange carrier. The AIN 11, which is well known to those skilled in the art, is the operating environment of the preferred embodiments of the present invention. The AIN is described in the commonly-owned patent to Weisser, Jr., U.S. Pat. No. 5,438,568, which is incorporated herein by reference.

The AIN 11 includes a plurality of central offices switches with some of the central office switches equipped with service switching points (SSPs). A representative SSP is shown as an originating switch, SSP 12a, in FIG. 1. An SSP (specifically, a Class 5 central office switch) is the AIN component of a typical electronic central office switch used by a local exchange carrier. The terms "SSP" and "switch" are used interchangeably herein and are understood to refer to a telecommunications switch for connecting voice channel circuits, including voice channel lines, commonly designated as 14. The SSP 12a is preferably equipped with AIN software release 0.1 or higher release.

Each SSP in the AIN 11 "services," or serves as an originating switch for a number of subscriber lines. An originating switch is typically directly connected with the subscriber lines serviced by the switch. Thus, the originating switch that services a subscriber's line is usually the first network element of the AIN 11 to process communications originating on the subscriber's line. The originating switch receives a communication originating on the subscriber line and implements further processing, such as routing the communication for connection with a terminating station. For example, the SSP 12a may receive a communication from an originating station 16a on the subscriber line 14a and route the communication for connection with a terminating station 16c in accordance with the packet-switched protocol of the PSTN 10. The details of communication routing are familiar to those skilled in the art and will not be further described herein. For more information regarding communication routing, see Bellcore Specification TR-NWT-001284 Switching Systems Generic Requirements for AIN 0.1, incorporated herein by reference.

The switches of the AIN 11 are interconnected by a network of voice channel lines known as "trunks" commonly designated as 20 in FIG. 1. Trunks are the voice channel circuits that interconnect the central office switches to connect voice channel communications. The term "communication" is used herein to include all messages or communications that may be exchanged between two pieces of terminating equipment. In FIG. 1, the terminating equipment is represented by telephones that are commonly designated as 16. Although telephones are illustrated as the pieces of terminating equipment, those skilled in the art will understand that terminating equipment may include other communication devices, such as wireless telephones, facsimile machines, computers, modems, etc.

Each piece of terminating equipment in the PSTN 10 is preferably assigned a directory number. The term "directory number" is used herein in a manner consistent with its generally understood meaning of a number that is dialed or input by an originating party at an originating station to reach a terminating station associated with the directory number. A directory number, typically a seven or ten digit number, is commonly referred to as a "telephone number" and may be assigned to a specific telephone line, such as the telephone line 14c shown in FIG. 1.

It should also be noted that FIG. 1 illustrates a conventional land-line telecommunications system, in which each subscriber is associated with a unique subscriber line, such as the subscriber line 14a. For simplicity, the preferred embodiments of the present invention are described in the context of the conventional land-line telecommunications system illustrated by FIG. 1. It should be understood, however, that alternative embodiments of the present invention may operate in association with cellular or other wireless telecommunications systems.

In the following description of the preferred embodiments, a communication is routed from an originating station 16a to a terminating station 16c. Routing the communication from the originating station 16a to the terminating station 16c involves the selection of a routing path for the communication and may also involve the implementation of one or more advanced network functions, such as call forwarding, calling party identification, prepaid or debit-card communication services, and the like. In fact, a wide variety of advanced network functions are presently available though the AIN 11. The ability of a typical SSP to provide these advanced network functions, however, is limited due to physical and other constraints. The AIN 11 therefore provides for increased information processing capability through a system of intelligent network elements that are functionally connected with the SSPs through a network of data links that are commonly designated as 22 in FIG. 1.

These intelligent network elements of the AIN 11 can communicate with each other, and with the SSPs of the network, via digital data messages transmitted over the network of digital data links 22. An SSP may be configured to interface with these intelligent network elements through the use of a "trigger." In general, a trigger serves as an indicator for the SSP to take certain action. The SSP is configured so that, when the SSP detects a predetermined set of conditions defining the trigger in association with a communication, the SSP creates an appropriate digital data message for transmission over the network of digital data links 22. The SSP may also suspend routing of the communication (i.e., hold the communication) until the SSP receives a reply to its message from an appropriate network element via the network of digital data links 22 instructing the SSP to take a certain action. If the SSP receives no instructions within a certain amount of time, the SSP "times-out" and executes a default task for the communication.

The message created by an SSP in response to a trigger is known as a "query" message. A query message opens a "transaction" and the SSP generally holds the communication while the transaction remains open. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. A trigger is typically activated or deactivated at an SSP by another network element through an "update" message. Query messages, conversation messages, response messages, and update messages are standard types of messages defined by the AIN protocol. The details of the AIN protocol are well known to those skilled in the art and will not be further described herein. For more information regarding the AIN protocol, see Bellcore Specification TR-NWT-001284 Switching Systems Generic Requirements for AIN 0.1, reference above.

For the preferred embodiments of the present invention, the originating switch 12a is preferably an SSP. It is noted, however, that the AIN 11 may also include non-SSP central office switches (not shown). It will be appreciated that a non-SSP switch may initially receive a communication on a subscriber line and pass the communication to another switch, such as the SSP 12a, for further processing. Similarly, in a cellular or wireless network, a mobile switching office or other receiver/transmitter may initially receive a communication from a cellular telephone or wireless unit and route the communication to another network element, such as the SSP 12a, for further processing. In this manner, advanced network functions available through the AIN 11 may be provided to wireless units and to subscriber lines that are directly connected to non-SSP switches.

Each switch in the AIN 11 is connected to a local signal transfer point (STP) via a data link. This arrangement is represented in FIG. 1 by the originating switch 12a, which is connected to the STP 24 by a data link 22a. The STP 24 is a multi-port, high-speed packet switch that is programmed to respond to the routing information in the SS7 protocol, and route the packet to its destination.

Much of the intelligence of the AIN 11 resides in a plurality of local service control points (SCPs), represented by an SCP 28, which is connected to the STP 24 by an SS7 data link 22c. An SCP, such as the SCP 28, is a remotely programmable intelligent network element. The SCP 28 is preferably equipped with AIN software release 0.1 or higher release. As is known to those skilled in the art, SCPs are physically implemented by relatively powerful fault tolerant computers. Among the functions performed by SCPs is the maintenance of network databases that are used in providing subscribers with advanced network functions.

Additional devices for implementing advanced network functions within the AIN 11 are provided by a regional STP 32, a regional SCP 34, and a service management system (SMS) 40. Both the regional SCP 34 and the local SCP 28, which represents a plurality of local SCPs distributed throughout the AIN 11, are connected via respective data links 22g and 22h to the SMS 40. The SMS 40 provides a centralized platform for remotely programming the various SCPs of the AIN 11 so that a coordinated information processing scheme may be implemented for the AIN 11. The SMS 40 is implemented by a large general purpose computer and interfaces to business offices of the local exchange carrier and interexchange carriers. The SMS 40 downloads information to the databases of SCPs 28 and 34 when subscribers set up or modify their ensemble of AIN services. Similarly, the SMS 40 downloads, on a non-realtime basis, billing information to a billing system 46 that is needed in order to appropriately invoice subscribers for the services provided.

The AIN 11 thus provides subscribers with a selectable menu of advanced network functions. These advanced network functions are typically sold on a per-service basis, or in groups of services known as calling plans. Each subscriber may select a set of advanced network functions, or a calling plan, that suits the subscriber's needs. Moreover, each subscriber may generally select among a plurality of local advanced network functions as well as select among a plurality of long distance advanced network functions. The subscriber's local exchange carrier is generally responsible for maintaining accounting records for both local and long distance services, and producing unified billing statements for individual subscribers.

The billing system 46 produces these billing statements. Information may be downloaded from the SMS 40 to the billing system 46, and vice versa, in association with the preparation of the billing statements. The operation of a billing system of a telecommunications service provider, such as the billing system 46, is well known to those skilled in the art and will not be further described herein.

It will be appreciated that the billing system 46 generally requires accounting records for each subscriber on a per-communication basis. These per-communication accounting records for a particular subscriber are typically created, in a manner well known to those skilled in the art, by the originating switch that services the subscriber's line. For example, the SSP 12a creates per-communication accounting records for communications originating on the subscriber line 14a. Each of these accounting records preferably includes the subscriber's directory number, the terminating station directory number, and the duration of the connection between the originating station on the subscriber line and a terminating station. The per-communication accounting records created by the SSP 12a for the subscriber line 14a are periodically downloaded to the billing system 46 on a non-realtime basis. The billing system 46 computes the costs for the communications represented by the various accounting records and prepares billing statements to be mailed to the subscriber.

Providing a subscriber with long distance telecommunication service presently requires that each long distance communication originating on the subscriber's line be assigned to a particular long distance carrier. Referring to FIG. 1, each long distance carrier may operate a physically distinct long distance network, as represented by the long distance networks 18a through 18n. An originating switch, such as the SSP 12a, may selectively route a communication received on a subscriber line through any of long distance networks 18a through 18n. For example, the SSP 12a may be programmed to route long distance communications originating on the subscriber line 14a through the long distance network operated by a long distance carrier selected by the subscriber.

It should be understood, however, that the network facilities operated by each long distance carrier may not be physically distinct, as implied by FIG. 1. In fact, the networks operated by the various long distance carriers typically share common facilities and are interconnected at various network elements throughout the PSTN 10. Moreover, more than one entity may have access rights to a particular network element in the PSTN 10. In view of these attributes of the PSTN 10, the preferred operating environment of the present invention is not limited to the relatively simple configuration shown in FIG. 1. Rather, FIG. 1 shows an illustrative portion of the PSTN 10 sufficient to describe the preferred embodiments of the present invention. Many other network elements and interconnections, including SSP, non-SSP, and MTSO switches for servicing other the pieces of terminating equipment, are not shown in FIG. 1, but will be understood to be appropriate for use with the present invention.

DESCRIPTION OF A FIRST PREFERRED EMBODIMENT

To implement a system in which a subscriber may select a preferred carrier, a code known as a "carrier code" is associated with each communication originating on the subscriber's line. The carrier code is used to route a communication on the network associated with the carrier code and may be used as part of an accounting process to attribute the communication to that network. Generally described, the present invention provides a method and system for quickly changing this carrier code when the subscriber changes his/her preferred carrier so that routing and/or accounting attribution of communications may be changed more quickly to the "new" preferred carrier.

FIG. 1 illustrates the operating environment of a first preferred embodiment of the present invention, in which a long distance communication is assigned to a preferred long distance carrier for accounting and/or communication routing purposes. A long distance carrier-of-record code for each subscriber line serviced by the SSP 12a is included in a subscriber database 44 maintained at the SSP 12a. As will be understood by those skilled in the art, the subscriber database may be maintained at a different SSP than the originating SSP, may be maintained at a different network element, or at an intelligent peripheral, and be consulted by the originating SSP. Reference to the long distance carrier-of-record code for a subscriber line provides that a communication originating on the subscriber's line, such as the subscriber line 14a, be assigned for accounting and/or for communication routing purposes to the long distance carrier associated with the code. Assigning a communication to a carrier preferably includes creating an accounting record attributing the communication to the carrier and may, but need not, include physically routing the communication through a network or network element associated with the carrier.

For example, the subscriber database 44 maintained at the SSP 12a includes a long distance carrier-of-record code for the subscriber line 14a. In this example, assume that the subscriber has subscribed to Desai Communications as its long distance carrier. Thus, the subscriber database includes "Desai" as the long distance carrier-of-record code for the subscriber's line. When the SSP 12a receives a long distance communication originating on the subscriber line 14a, the SSP 12a retrieves the long distance carrier-of-record code (Desai) for the subscriber line 14a from the subscriber database 44, and routes the communication to the terminating station 16c through a particular one (Desai Communications) of the long distance networks 18a through 18n identified by the long distance carrier code for the subscriber line 14a. The SSP 12a also attributes the communication to the appropriate long distance carrier (Desai) by including the long distance carrier-of-record code in an accounting record created for the communication. The billing system 46 uses this accounting record to produce an invoice including a charge for the communication so that the appropriate amount of money may be collected from the subscriber and forwarded to the long distance carrier, as described previously.

In view of the foregoing, it will be appreciated that the long distance carrier for the subscriber line 14a may be changed by altering the long distance carrier-of-record code for the subscriber line 14a in the subscriber database 44 at the SSP 12a. For example, the subscriber may change its subscription for long distance service from Desai Communications to Chan Telecommunications. Thus, the long distance carrier-of-record code must be changed from "Desai" to "Chan" so as to implement the change for routing and/or accounting attribution of the subscriber's long distance communications. The change may not be implemented quickly because access to a central office switch, such as the SSP 12a (or other element or intelligent peripheral maintaining the subscriber database), is generally restricted. The present invention addresses this problem by using network elements to quickly implement long distance carrier change requests. The description of the preferred embodiment includes reference to an SSP, an SCP, and an SMS as the network elements used to implement the present invention. Those skilled in the art will understand that other network elements such as a services node or intelligent peripherals such as peripherals that include databases may be used in place of or in combination with the elements referenced in connection with the preferred embodiment so long as they include the appropriate functionality and connections.

A preferred embodiment of the present invention illustrated by FIG. 1 provides a system in which the SCP 28 may be used to quickly change a subscriber's long distance carrier. Long distance carrier change requests for the AIN 11 are typically received at a central location, preferably the service management center housing the SMS 40. The SMS 40 is operable for remotely programming all of the SCPs of the AIN 11, including the SCP 28. The SMS 40 advantageously provides a central location for implementing long distance carrier change requests using the various SCPs. But the SSP 12a already includes the subscriber databases 44 for assigning long distance communications originating on a subscriber's line to a long distance carrier selected by a subscriber. The SSP 12a, however, cannot be remotely programmed from the SMS 40.

One approach for quickly implementing long distance carrier change requests would be to relocate the entire subscriber database 44 to the SCP 28 or another network element where it could be remotely programmed from. This approach, however, would consume and/or idle a large amount of information processing capability. Moreover, locating the entire subscriber database 44 in the SCP 28 or another network element would require a data-link communication between the SSP 12a and the SCP 28 or another network element for each long distance communication routed by the SSP 12a. This approach would therefore greatly increase the number of data-link communication between the SSP 12a and the SCP 28 or another network element.

The preferred embodiments of the present invention avoid these pitfalls associated with locating the entire subscriber database 44 in the SCP 28 or another network element. To avoid these pitfalls, a subscriber's preferred long distance carrier code is initially entered into an interim long distance carrier database in a network element such as the SCP 28. The SCP 28 provides the SSP 12a with the subscriber's preferred long distance carrier code only during an interim period. This interim period begins after the change request from the subscriber is received and the preferred long distance carrier code is entered into the interim long distance carrier database. This interim period ends when the long distance carrier change request has been programmed into the subscriber database 44 at the SSP 12a. Once the long distance carrier change request has been programmed into the subscriber database 44 at the SSP 12a, the interim long distance carrier database 42 is no longer referenced in the course of routing communications originating on the subscriber's line 14a. The subscriber's preferred long distance carrier code then may be deleted from the interim long distance carrier database 42 at the SCP 28. Referring to the example again, when the subscriber changes its subscription to Chan Telecommunications as the preferred long distance carrier, then "Chan" as the preferred long distance carrier code is entered into the interim long distance carrier database in association with the subscriber's line(s). This entry marks the beginning of the interim period during which the interim long distance carrier database is consulted with respect to long distance communications on the subscriber's line(s). As will be described below, the code "Chan" is thereafter entered into the subscriber database in place of the previous "Desai" code. This entry of the "Chan" code into the subscriber database marks the end of the interim period, and the interim long distance carrier database is no longer consulted with respect to long distance communications on the subscriber's line(s).

Using a network element such as the SCP 28 to provide the SSP 12a with preferred long distance carrier codes advantageously allows long distance carrier code change requests to be implemented quickly. The change requests are implemented quickly because a network element such as the SCP 28 is remotely programmable, whereas the SSP 12a is not remotely programmable. In addition, under the present operation of a typical AIN 11, only a small fraction of the long distance communications routed by the SSP 12a involve long distance carrier code change requests that have been received by the local exchange carrier, but not yet programmed into the subscriber database 44 at the SSP 12a. Using a network element such as the SCP 28 to provide the SSP 12a with preferred long distance carrier codes only on an interim basis therefore minimizes the amount of information processing required to implement long distance carrier code change requests. Using a network element such as the SCP 28 to provide the SSP 12a with preferred long distance carrier codes only on an interim basis also minimizes the amount of data-link traffic between the network element and the SSP 12a that is required to implement long distance carrier code change requests.

According to a preferred embodiment of the present invention, a long distance carrier code change request for the subscriber line 14a is preferably handled as follows: The long distance carrier code change request indicating the subscriber's preferred long distance carrier is received at the SMS 40, usually from the preferred long distance carrier. For example, a request to change from Desai Communications to Chan Telecommunications is received. Chan Telecommunications is now considered to be the preferred long distance carrier. An attendant at the SMS 40 enters the preferred long distance carrier code corresponding to the subscriber's preferred long distance carrier into an interim long distance carrier database 42 at the SCP 28. For example, "Chan" is entered into the interim long distance carrier database. The SCP 28 transmits an update message to the SSP 12a activating a trigger for the subscriber line 14a. This trigger serves as an indicator that the SSP 12a consult with the interim long distance carrier database with respect to long distance communications received on the subscriber's line(s). When the SSP 12a subsequently receives a long distance communication originating on the subscriber line 14a, the SSP 12a holds the communication and retrieves the long distance carrier-of-record code for the subscriber line 14a from the subscriber database 44. Referring to our example, the SSP retrieves "Desai" as the long distance carrier-of-record code for the subscriber's line. This code is "Desai" because no change in the subscriber database has taken place as yet with respect to the subscriber's long distance carrier-of-record code. The SSP 12a includes the long distance carrier-of-record code for the subscriber line 14a in a query message and transmits the query message to the SCP 28.

The SCP 28 responds to this query message by retrieving the preferred long distance carrier code for the subscriber line 14a from the interim long distance carrier database 42. In the example, the SCP retrieves "Chan" as the preferred long distance carrier code. The SCP then compares the long distance carrier-of-record code to the preferred long distance carrier code. In this case, the subscriber's preferred long distance carrier code will have been recently entered into the interim long distance carrier database 42 because the subscriber has made a change request. Referring to the example, the SCP compares "Desai" to "Chan." The SCP 28 determines that the long distance carrier-of-record code is different from the preferred long distance carrier code. The SCP 28 includes the preferred long distance carrier code in a response message and transmits the response message to the SSP 12a. Upon receiving the response message, the SSP 12a assigns the communication to the preferred long distance carrier by routing the communication through the long distance network operated by the preferred long distance carrier. Referring to the example, the SSP 12a routes the communication through Chan Telecommunications. The SSP 12a also preferably attributes the communication to the preferred long distance carrier by including the preferred long distance carrier code in an accounting record for the communication. The process described above occurs for each long distance communication subsequently received on the subscriber line 14a during the previously referenced interim period. Preferably, this process repeats for each such communication until the trigger for the subscriber line 14a is deactivated.

A description is now provided as to the removal of the indicator (deactivation of the trigger) so that the SSP does not consult the interim long distance carrier database with respect to long distance communications received on the subscriber's line(s). At some time after the attendant at the SMS 40 entered the preferred long distance carrier code for the subscriber line 14a into the interim long distance carrier database 42 at the SCP 28, a service technician enters the preferred long distance carrier code for the subscriber line 14a into the subscriber database 44 at the SSP 12a. In other words, the preferred long distance carrier code corresponding to the most recent change request becomes the long distance carrier-of-record code when the service technician finishes the entry. For example, the service technician enters the "Chan" code into the subscriber database. Thus, the "Chan" code is substituted for the "Desai" code as the long distance carrier-of-record code.

To continue the example, the SSP 12a subsequently receives the first long distance communication originating on the subscriber line 14a after the preferred long distance carrier code for the subscriber line 14a has been entered into the subscriber database 44 at the SSP 12a. The indicator for the SSP to consult the interim long distance carrier database is still in place in that the trigger for the subscriber line 14a has not yet been deactivated. Thus, the trigger is still active when this communication is received. The SSP 12a therefore holds the communication and retrieves the long distance carrier-of-record code for the subscriber line 14a from the subscriber database 44. As noted, after the entry by the service technician, the long distance carrier-of-record code is now the carrier code corresponding to the most recent change request, i.e., the "Chan" code. The SSP 12a includes the long distance carrier-of-record code in a query message and transmits the query message to the SCP 28.

The SCP 28 responds to this query message by retrieving the preferred long distance carrier code for the subscriber line 14a from the interim long distance carrier database 42. In the example, the SCP retrieves "Chan" as the preferred long distance carrier code. The SCP 28 compares the long distance carrier-of-record code for the subscriber line 14a to the preferred long distance carrier code for the subscriber line 14a. The SCP 28, compares "Chan" as the long distance carrier-of-record code to "Chan" as the preferred long distance carrier code. As the preferred long distance carrier code for the subscriber line 14a has been entered into both the subscriber database 44 and the interim long distance carrier database 42, the SCP 28 determines that the long distance carrier-of-record code is the same as the preferred long distance carrier code. In other words, "Chan" is the same as "Chan." The SCP 28 responds to this determination by sending a response message to SSP 12a to instruct the SSP 12a to assign the communication to the preferred long distance carrier, as described previously.

The SCP 28 also responds to the determination that the long distance carrier-of-record code is the same as the preferred long distance carrier code by removing the indicator so that the SSP does not consult the interim long distance carrier database with respect to long distance communications received on the subscriber's line(s). The SCP removes the indicator by transmitting a second update message to the SSP 12a to deactivate the trigger for the subscriber line 14a. Deactivation of the trigger for the subscriber line 14a causes the SSP 12a to route a subsequent communication originating on the subscriber line 14a without holding the communication, unless it is held for a reason unrelated to the present invention. The second update message deactivating the trigger for the subscriber line 14a thus indicates that a bi-directional transaction between the SCP 28 and the SSP 12a is not required in association with the present invention before subsequent communications originating on the subscriber line 14a are routed by the SSP 12a. The SCP 28 preferably transmits this update message after the response message to minimize the delay in routing the communication and thus minimize the chance that the SSP will time-out while the SCP 28 responds to the query message. The preferred long distance carrier code for the subscriber line 14a may also be deleted from the interim long distance carrier database 42 at the SCP 28.

It is also noted that the preferred embodiment of the present invention, as described above, is implemented using update, query, and response messages, which are standard types of messages in the AIN protocol. Each SSP and SCP in the AIN 11 responds to these messages in a predetermined way, regardless of the manufacturer or model of the device. Using these standard messages of the AIN protocol to implement the preferred embodiments of the present invention advantageously allows standardization of the procedures for quickly implementing long distance carrier change requests involving SSPs and SCPs of different makes and models.

AN ADDITIONAL FEATURE OF THE FIRST PREFERRED EMBODIMENT

The procedures described above may be implemented in conjunction with procedures that allow a calling party originating a communication on the subscriber line 14a to provide a preferred long distance carrier code on a per-communication basis. A communication, such as a telephone call, originating on the subscriber line 14a preferably includes dialed digits including routing instructions that are input by the calling party operating at the originating station 16a on the subscriber line 14a. These routing instructions typically include the directory number for the terminating station 16c. The dialed digits may further include a predefined code including a valid long distance carrier code that the calling party wishes to use for the present communication, as is well known to those skilled in the art. In this case, the dialed long distance carrier code is used as the preferred long distance carrier code, thus assigning the communication to the long distance carrier identified by the dialed long distance carrier code.

Referring again to our example, assume that "Desai" is the carrier-of-record code for the subscriber line 14a in the subscriber database 44 and that "Chan" is the preferred carrier code for the subscriber line 14a in the interim long distance carrier database 42. The additional feature of the first preferred embodiment allows a calling party originating a communication on the subscriber line 14a to select a preferred long distance carrier, which may be a carrier other than Desai Communications or Chan Telecommunications, for that particular communication. For example, assume that the calling party wants the communication to be routed through a network operated by "Ace Telco." The calling party may include a predefined carrier code, such as "ACE," associated with Ace Telco in the dialed digits input by the calling party to originate the communication. A triggering code such as "*XX" may also be required to signify that the dialed digits include a predefined carrier code for the communication. Thus, the calling party may enable the additional feature by dialing "*XX-ACE-ZZZ-ZZZ-ZZZZ" where "ZZZ-ZZZ-ZZZZ" is the directory number associated with the desired terminating equipment. In response, "ACE" is used as the preferred carrier code for the communication, which causes the communication to be routed through the long distance network operated by Ace Telco. In addition, the SSP 12a may include the carrier code "ACE" in an accounting record to attribute the communication to Ace Telco for accounting purposes. Thus, the method steps described above in association with the first preferred embodiment are not performed in connection with this additional feature of the first preferred embodiment.

DESCRIPTION OF A SECOND PREFERRED EMBODIMENT

FIG. 2 illustrates the operating environment of another preferred embodiment of the present invention, in which a local communication is assigned to a preferred local exchange carrier, such as a resale service provider, for accounting purposes. In this embodiment, a network element such as the SCP 28 is used to quickly change a subscriber's local exchange carrier while allowing the subscriber to maintain the same directory number. That is, the subscriber's local exchange carrier may be changed without also changing the subscriber's directory number. It will therefore be appreciated that preferred embodiment of the present invention illustrated in FIG. 2 is adapted to implement local number portability.

The preferred method for changing a subscriber's long distance carrier described above with reference to FIG. 1 can be used to change a subscriber's local exchange carrier with only a few modifications. First, a local carrier-of-record code for the subscriber line 14a is included in the subscriber database 44 maintained at the SSP 12a or other appropriate element. Second, an interim local carrier database 43, which may be remotely programmed, is maintained at the SCP 28 or other appropriate element. It will be understood that the interim local carrier database 43 and the interim long distance carrier database 42 may be combined into a single interim carrier database. Third, the SSP 12a need not select a particular network or network element associated with the preferred local carrier through which to route a communication originating on the subscriber line 14a. Rather, all of the local exchange carriers may utilize the same local exchange network 17, and the communication may be assigned to the preferred local exchange carrier through an accounting record created by the SSP 12a. In other words, the local exchange network 17 may remain a proprietary network that is physically accessed only by the operator of the local exchange network. Although physical access to the local exchange network may remain proprietary, accounting records maintained by the operator of the local exchange network may allow local communications to be assigned to various local exchange carriers, such as resale service providers.

ADDITIONAL FEATURES OF THE SECOND PREFERRED EMBODIMENT

The second preferred embodiment described above may be implemented in conjunction with procedures that allow a communication to be routed through a particular network element within the local exchange network 17. Specifically, in a local exchange network including local number portability, a central office switch may select a particular communication path through the local exchange network 17 based on a subscriber's preferred local carrier code. For example, the SSP 12a may route communications originating on the subscriber line 14a through the local exchange network 17 to a particular intelligent platform operated by, or programmed to implement advanced network functions associated with, the preferred local carrier. In this manner, the preferred local carrier may provide subscribers with advanced network functions such as communication forwarding, voice mail, debit account services, and the like.

In addition, the procedures described above for the second preferred embodiment may be implemented in conjunction with procedures that allow a calling party to provide a preferred long distance carrier code on a per-communication basis. These procedures for allowing a calling party to provide a preferred long distance carrier code on a per-communication basis are essentially the same as those described previously with respect to the additional features of the first preferred embodiment.

DESCRIPTION OF A PREFERRED METHOD FOR CHANGING A SUBSCRIBER'S PREFERRED CARRIER

FIG. 3 is a logic flow diagram that illustrates a preferred method for changing a subscriber's local exchange or long distance carrier. A more specific description of a preferred method for changing a subscriber's long distance carrier within the AIN environment as illustrated on FIG. 1 is described with respect to FIGS. 4 and 5 below. Similarly, a more specific description of a preferred method for changing a subscriber's local exchange carrier within the AIN environment as illustrated on FIG. 2 is described with respect to FIGS. 6 and 7 below.

Referring to FIG. 3, it should be understood that a carrier-of-record code indicating a subscriber's carrier-of-record is included in a subscriber database prior to the process illustrated by FIG. 3. A carrier-of-record code is ordinarily used to assign communications associated with the subscriber to the subscriber's carrier-of-record. A subscriber may choose a different carrier for each respective line servicing the subscriber's originating equipment. In addition, for each line, a subscriber may choose a different carrier-of-record for each type of communications routed over different networks. For example, a subscriber may choose a local carrier-of-record for local communications, a long distance carrier-of-record for long distance communications, a data network carrier-of-record for data communications, etc. It is also noted that more than one carrier code may refer to the same carrier. Reference heretofore has been made only to local and long distance telecommunications services. But the present invention may also be used in routing or attributing for accounting purposes a communication on a data, wireless, video, or other network.

FIG. 3 is entered at step 300, and in step 302 a check is made to determine whether a carrier change request has been received for a subscriber. If a carrier change request is not received in step 302, the "NO" branch is followed from step 302 to step 308, in which a check is made to determine whether a communication associated with the subscriber has been received. Steps 308 et seq. are described below. If a carrier change request is received in step 302, the "YES" branch is followed from step 302 to step 304. In step 304, the preferred carrier code for the subscriber received in the carrier change request is entered into an interim carrier database.

In step 306, a trigger is activated for the subscriber's line. The trigger for the subscriber's line remains active until the trigger is deactivated. The active trigger causes the preferred carrier code to be retrieved from the interim carrier database whenever a communication is received on the subscriber's line.

Step 306, and the "NO" branch from step 302, are followed by step 308, in which a check is made to determine whether a communication has been received on the subscriber's line. Upon receipt of a communication on the subscriber's line in step 308, the carrier-of-record code is retrieved from the subscriber database in step 310. Step 310 is followed by step 312, in which it is determined whether a trigger is active for the subscriber's line. If there is no active trigger for the subscriber's line, the "NO" branch is followed from step 312 to step 320, in which the communication is assigned to the preferred carrier. In this case, the preferred carrier is the carrier associated with the carrier-of-record code.

If a trigger is active for the subscriber's line, the "YES" branch is followed from step 312 to step 314, in which the preferred carrier code is retrieved from the interim carrier database. Step 314 is followed by step 316, in which it is determined whether the carrier-of-record code is the same as the preferred carrier code. If the carrier-of-record is the same as the preferred carrier, the "YES" branch is followed from step 316 to step 318, in which the trigger for the subscriber is deactivated. Step 318 is followed by step 320, in which the communication is assigned to the preferred carrier. In this case, the preferred carrier is the carrier associated with the carrier-of-record code.

Referring again to step 316, if the carrier-of-record code is not the same as the preferred carrier code, the "NO" branch is followed from step 316 to step 320, in which the communication is assigned to the preferred carrier. In this case, the preferred carrier is the carrier associated with the preferred carrier code. Step 320 is followed preferably by step 322, in which it is determined whether the subscriber has discontinued service. If the subscriber has discontinued service, the "YES" branch is followed from step 322 to the "END" step 324, and the process illustrated by the logic flow diagram of FIG. 3 is concluded. If the subscriber has not discontinued service, the "NO" branch loops to step 302, in which it is determined whether a carrier change request has been received for the subscriber. The logic flow diagram illustrated by FIG. 3 thus loops through the steps 302 through 322 so long as the subscriber continues to receive service.

DESCRIPTION OF A PREFERRED METHOD FOR CHANGING A SUBSCRIBER'S LONG DISTANCE CARRIER

FIG. 4 is a logic flow diagram that illustrates a preferred method for changing a subscriber's long distance carrier. The following description of FIGS. 4 and 5 will refer to the preferred environment illustrated in FIG. 1 in describing a preferred method for implementing a long distance carrier change request for the subscriber line 14a. For the following description, a long distance communication originating at the originating station 16a on the subscriber line 14a is routed to the terminating station 16c. In addition, SSP 12a is the originating switch for the subscriber line 14a and the SCP 28 is programmed to implement long distance carrier change requests for the SSP 12a.

FIG. 4 is entered at step 400, and in step 402 it is determined whether a long distance carrier change request has been received for the subscriber line 14a in step 402. This long distance carrier change request is preferably received at the SMS 40. If a long distance carrier change request has not been received for the subscriber line 14a, the "NO" branch is followed from step 402 to step 408, in which a check is made to determine whether a communication is received on the subscriber line 14a at the SSP 12a. Steps 408 et seq. are described below.

If a long distance carrier change request has been received for the subscriber line 14a, the "YES" branch is followed from step 402 to step 404. In step 404, the preferred long distance carrier code for the subscriber line 14a received in the long distance carrier change request is entered into the interim long distance carrier database 42 at the SCP 28. In step 406, an update message is transmitted from the SCP 28 to the SSP 12a. This update message activates a trigger for the subscriber line 14a at the SSP 12a. The trigger for the subscriber line 14a remains active at the SSP 12a until a subsequent update message is received at the SSP 12a that deactivates the trigger. The active trigger causes the SSP 12a to hold a communication received on the subscriber line 14a and transmit a query message to the SCP 28. The SSP 12a holds the communication until the SSP 12a receives a response message from the SCP 28 instructing the SSP 12a to route the communication to the terminating station 16c.

In step 408, a check is made to determine whether a communication has been received at the SSP 12a on the subscriber line 14a. If no communication has been received, the "NO" branch loops to step 402 to monitor whether a long distance carrier change request has been received. If a communication has been received at the SSP 12a on the subscriber line 14a, the "YES" branch is followed from step 408 to step 410, in which the SSP 12a retrieves the long distance carrier-of-record code from the subscriber database 44. Step 410 is followed by step 411, in which it is determined whether a trigger is active for the subscriber line 14a. If there is not an active trigger for the subscriber line 14a, the "NO" branch is followed from step 411 to step 420, in which the communication is routed to the terminating station 16c. In this case, the communication is assigned to the preferred carrier, which is the carrier associated with the carrier-of-record code in the subscriber database.

Referring again to step 411, if a trigger for the subscriber line 14a is active, the "YES" branch is followed from step 411 to step 412, in which the communication is held at the originating switch SSP 12a. A query message including the dialed digits and the long distance carrier-of-record code is transmitted from the SSP 12a to the SCP 28 in step 414. Step 414 is followed by routine 416, in which the query message is processed at the SCP 28. Routine 416 is described in more detail with respect to FIG. 5 below.

Routine 416 is followed by step 418, in which a response message including a preferred long distance carrier code is transmitted from the SCP 28 to the SSP 12a. Step 418 is followed by step 420, in which the communication is routed to the terminating station 16c through a particular one of the long distance networks 18a through 18n that is identified by the preferred long distance carrier code received from the SCP 28. Step 420 is followed by optional step 422, in which an accounting record is created by the SSP 12a attributing the communication to the preferred long distance carrier. This accounting record is later downloaded to the billing system 46, which uses the accounting record to produce an appropriate invoice for the communication.

Step 422 is followed by step 424, in which it is determined whether the subscriber has discontinued service. If the subscriber has discontinued service, the "YES" branch is followed to the "END" step 426 and the logic flow diagram illustrated by FIG. 4 is completed. If the subscriber has not discontinued service, the "NO" branch loops from step 424 to step 402. The logic flow diagram illustrated by FIG. 4 thus loops through the steps 402 through 424 so long as the subscriber continues to receive service.

DESCRIPTION OF A PREFERRED METHOD FOR PROCESSING A QUERY MESSAGE IN ASSOCIATION WITH CHANGING A SUBSCRIBER'S LONG DISTANCE CARRIER

FIG. 5 is a logic flow diagram that illustrates a preferred method for processing a query message associated with changing a subscriber's long distance carrier. The logic flow diagram illustrated by FIG. 5 corresponds to routine 416 shown on FIG. 4. The logic flow diagram illustrated by FIG. 5 thus begins following step 414 shown on FIG. 4.

FIG. 5 is entered at step 500, and in step 502 the SCP 28 analyzes the query message, including the dialed digits and the long distance carrier-of-record code. In step 504, the SCP 28 determines whether the communication associated with the query message is a long distance communication. If the communication is not a long distance communication, the "NO" branch is followed from step 504 to step 518, in which a response message is transmitted from the SCP 28 to the SSP 12a. It should be understood that the trigger for the subscriber line 14a may be used in association with network functions other than quickly changing a subscriber's long distance carrier. In this case, additional steps associated with these other network functions (not shown) may be implemented. For example, the communication associated with the query message may be a local communication and the method described below with respect to FIGS. 6 and 7 may be followed.

Referring again to step 504, if the communication associated with the query message is a long distance communication, the "YES" branch is followed from step 504 to step 506, in which it is determined whether the dialed digits included in the query message include an optional valid long distance carrier code. If the answer to the inquiry of step 506 is yes, the "YES" branch is followed to step 508, in which the optional dialed long distance carrier code is included in a response message as the preferred long distance carrier code for the communication. Step 508 is followed by step 518, in which the response message is transmitted from the SCP 28 to the SSP 12a.

If the answer to the inquiry of step 506 is no, the "NO" branch is followed from step 506 to step 510, in which the SCP 28 retrieves the preferred long distance carrier code for the subscriber line 14a from the interim long distance carrier database 42. Step 510 is followed by step 512, in which it is determined whether the long distance carrier-of-record is the same as the preferred long distance carrier. That is, it is determined whether the long distance carrier code for the subscriber line 14a included in the subscriber database 44 at the SSP 12a is the same as the long distance carrier code for the subscriber line 14a included in the interim long distance carrier database 42 at the SCP 28.

If the answer to the inquiry of step 512 is yes, the "YES" branch is followed from step 512 to step 514, in which an update message is transmitted from the SCP 28 to the SSP 12a to deactivate the trigger at the SSP 12a. Transmission of this update message is preferably delayed until after transmission of the response message (step 518) to minimize the chance that the SSP 12a will time-out while the SCP 28 processes the query message. Step 514 and the "NO" branch from step 512 are followed by step 516. In step 516, the preferred local carrier code is included in a response message. In step 518, this response message is transmitted from the SCP 28 to the SSP 12a. Following step 518, the logic flow diagram illustrated by FIG. 5 is complete. Step 518 is followed by step 520, in which the logic flow diagram illustrated by FIG. 4 continues at step 418.

DESCRIPTION OF A PREFERRED METHOD FOR CHANGING A SUBSCRIBER'S LOCAL EXCHANGE CARRIER

FIG. 6 is a logic flow diagram that illustrates a preferred method for changing a subscriber's local exchange carrier. The following description of FIGS. 6 and 7 will refer to FIG. 2 in describing a preferred method for implementing a long distance carrier change request for the subscriber line 14a. For the following description, a local communication originating at the originating station 16a on the subscriber line 14a is routed to the terminating station 16c through the local exchange network 17. In addition, the SSP 12a is the originating switch for the subscriber line 14a and the SCP 28 is programmed to implement local carrier change requests for the SSP 12a.

FIG. 6 is entered at step 600, and in step 602 it is determined whether a local carrier change request has been received for the subscriber line 14a in step 602. This local carrier change request is preferably received at the SMS 40. If a local carrier change request has not been received for the subscriber line 14a, the "NO" branch is followed from step 602 to step 608, in which a check is made to determine whether a communication has been received on the subscriber line 14a at the SSP 12a. Steps 608 et seq. are described below.

If a local carrier change request has been received for the subscriber line 14a, the "YES" branch is followed from step 602 to step 604. In step 604, the preferred local carrier code for the subscriber line 14a received in the local carrier change request is entered into the interim local carrier database 43 at the SCP 28. In step 606, an update message is transmitted from the SCP 28 to the SSP 12a. This update message activates a trigger for the subscriber line 14a at the SSP 12a. The trigger for the subscriber line 14a remains active at the SSP 12a until a subsequent update message is received at the SSP 12a that deactivates the trigger. The active trigger causes the SSP 12a to hold a communication received on the subscriber line 14a and transmit a query message to the SCP 28. The SSP 12a holds the communication until the SSP 12a receives a response message from the SCP 28 instructing the SSP 12a to route the communication to the terminating station 16c.

In step 608, a check is made to determine whether a communication has been received at the SSP 12a on the subscriber line 14a. If no communication has been received, the "NO" branch loops to step 602 to monitor whether a local carrier change request has been received. If a communication has been received at the SSP 12a on the subscriber line 14a, the "YES" branch is followed from step 608 to step 610, in which the SSP 12a retrieves the local carrier-of-record code from the subscriber database 44. Step 610 is followed by step 611, in which it is determined whether a trigger is active for the subscriber line 14a. If there is not an active trigger for the subscriber line 14a, the "NO" branch is followed from step 611 to step 620, in which the communication is routed through the local exchange network to the terminating station 16c.

Referring again to step 611, if a trigger for the subscriber line 14a is active, the "YES" branch is followed from step 611 to step 612, in which the communication is held at the originating switch SSP 12a. A query message including the dialed digits and the local carrier-of-record code is transmitted from the SSP 12a to the SCP 28 in step 614. Step 614 is followed by routine 616, in which the query message is processed at the SCP 28. Routine 616 is described in more detail with respect to FIG. 7 below.

Routine 616 is followed by step 618, in which a response message including a preferred local carrier code is transmitted from the SCP 28 to the SSP 12a. Step 618 is followed by step 620, in which the communication is routed to the terminating station 16c through the local exchange network 17. The SSP 12a may route communications originating on the subscriber line 14a through the local exchange network 17 to a particular intelligent platform operated by, or programmed to implement advanced network functions associated with, the subscriber's preferred local carrier. Step 620 is followed by step 622, in which an accounting record is created by the SSP 12a attributing the communication to the preferred local carrier. Unlike the long distance case, the step of creating an accounting record (step 622) is not an optional step in the preferred method and system of the local carrier implementation of the present invention. It is not optional because all communications will be routed through the local exchange network, but separate attribution or assignment of each communication is made for accounting purposes. Nonetheless, where alternative routing paths are possible, the accounting step (step 622) may be optional. This accounting record is later downloaded to the billing system 46, which uses the accounting record to produce an appropriate invoice for the communication.

Step 622 is followed by step 624, in which it is determined whether the subscriber has discontinued service. If the subscriber has discontinued service, the "YES" branch is followed to the "END" step 626 and the logic flow diagram illustrated by FIG. 6 is completed. If the subscriber has not discontinued service, the "NO" branch loops from step 624 to step 602. It will therefore be appreciated that the logic flow diagram illustrated by FIG. 6 loops through the steps 602 through 624 so long as the subscriber continues to receive service.

DESCRIPTION OF A PREFERRED METHOD FOR PROCESSING A QUERY MESSAGE IN ASSOCIATION WITH CHANGING A SUBSCRIBER'S LOCAL EXCHANGE CARRIER

FIG. 7 is a logic flow diagram that illustrates a preferred method for processing a query message associated with changing a subscriber's local carrier. The logic flow diagram illustrated by FIG. 7 corresponds to routine 616 shown on FIG. 6. The logic flow diagram illustrated by FIG. 7 thus begins following step 614 shown on FIG. 6.

FIG. 7 is entered at step 700, and in step 702 the SCP 28 analyzes the query message including the dialed digits and the local carrier-of-record code. In step 704, the SCP 28 determines whether the communication associated with the query message is a local communication. If the communication is not a local communication, the "NO" branch is followed from step 704 to step 718, in which a response message is transmitted from the SCP 28 to the SSP 12a. It should be understood that the trigger for the subscriber line 14a may be used in association with network functions other than quickly changing a subscriber's local carrier. In this case, additional steps associated with these other network functions (not shown) may be implemented. For example, the communication associated with the query message may be a long distance communication and the method described above with respect to FIGS. 4 and 5 may be followed.

Referring again to step 704, if the communication associated with the query message is a local communication, the "YES" branch is followed from step 704 to step 706, in which it is determined whether the dialed digits included in the query message include a valid local carrier code. If the answer to the inquiry of step 706 is yes, the "YES" branch is followed to step 708, in which the dialed local carrier code is included in a response message as the preferred local carrier code for the communication. Step 708 is followed by step 718, in which the response message is transmitted from the SCP 28 to the SSP 12a.

If the answer to the inquiry of step 706 is no, the "NO" branch is followed from step 706 to step 710, in which the SCP 28 retrieves the preferred local carrier code for the subscriber line 14a from the interim local carrier database 43. Step 710 is followed by step 712, in which it is determined whether the local carrier-of-record is the same as the preferred local carrier. That is, it is determined whether the local carrier code for the subscriber line 14a included in the subscriber database 44 at the SSP 12a is the same as the local carrier code for the subscriber line 14a included in the interim local carrier database 43 at the SCP 28.

If the answer to the inquiry of step 712 is yes, the "YES" branch is followed from step 712 to step 714, in which an update message is transmitted from the SCP 28 to the SSP 12a to deactivate the trigger at the SSP 12a. Transmission of this update message is preferably delayed until after transmission of the response message (step 718) to minimize the chance that the SSP 12a will time-out while the SCP 28 processes the query message. Step 714 and the "NO" branch from step 712 are followed by step 716. In step 716, the preferred local carrier code is included in a response message. In step 718, this response message is transmitted from the SCP 28 to the SSP 12a. Following step 718, the logic flow diagram illustrated by FIG. 5 is complete. Step 718 is followed by step 720, in which the logic flow diagram illustrated by FIG. 6 continues at step 618.

In view of the foregoing, it will be appreciated that the present invention provides a method and system for quickly changing a subscriber's long distance or local carrier while allowing the subscriber to maintain the same directory number. It should be understood that the foregoing relates only to specific embodiments of the present invention, and that numerous changes may be made therein without departing from the spirit and scope of the invention as defined by the following claims.

What is claimed is:

1. In an intelligent switched telecommunications network, a method for attributing a communication to a preferred carrier for accounting purposes, comprising the steps of:
   a. receiving a communication on a subscriber's line;
   b. in response to receiving the communication,
      i. obtaining a carrier-of-record code associated with the subscriber's line,
      ii. obtaining a preferred carrier code associated with the subscriber's line,
      iii. comparing the carrier-of-record code with the preferred carrier code for a comparison result, and
      iv. after the comparing step, determining the comparison result, the comparison result indicating either
         that the preferred carrier is the same as a carrier-of-record associated with the carrier-of-record code, or
         that the preferred carrier is a carrier associated with the preferred carrier code;
   c. based on the comparison result, creating an accounting record to attribute the communication to the preferred carrier; and
   d. repeating steps b–c for each communication received on the subscriber's line.

2. The method of claim 1, wherein step c further comprises routing the communication to a terminating station through a communications network associated with the preferred carrier.

3. In an intelligent switched telecommunications network, a method for routing a communication through a communications network associated with a preferred carrier, comprising the steps of:
   a. receiving a communication on a subscriber's line;
   b. in response to receiving the communication,
      i. obtaining a carrier-of-record code associated with the subscriber's line,
      ii. obtaining a preferred carrier code associated with the subscriber's line,
      iii. comparing the carrier-of-record code with the preferred carrier code for a comparison result, and
      iv. after the comparing step, determining the comparison result, the comparison result indicating either
         that the preferred carrier is the same as a carrier-of-record associated with the carrier-of-record code, or
         that the preferred carrier is a carrier associated with the preferred carrier code;
   c. based on the comparison result, routing the communication to a terminating station through the communications network associated with the preferred carrier; and
   d. repeating steps b–c for each communication received on the subscriber's line.

4. In an intelligent switched telecommunications network, a method for attributing a communication to a preferred carrier for accounting purposes, comprising the steps of:
   A. receiving a carrier change request, the carrier change request indicating a change in a subscriber's choice of the preferred carrier with respect to telecommunication services on a subscriber's line;
   B. entering a preferred carrier code in association with the subscriber's line into an interim carrier database, the preferred carrier code corresponding to the subscriber's choice of the preferred carrier;
   C. in response to entering the preferred carrier code into the interim carrier database, activating an indicator with respect to the subscriber's line, the indicator indicating that a query of the interim carrier database is required in response to a communication received on the subscriber's line;
   D. in response to receiving the communication on the subscriber's line, detecting the indicator with respect to the subscriber's line;
   E. in response to detecting the indicator,
      i. obtaining a carrier-of-record code associated with the subscriber's line,
      ii. obtaining the preferred carrier code associated with the subscriber's line,
      iii. comparing the carrier-of-record code with the preferred carrier code for a comparison result, and
      iv. determining the comparison result, the comparison result being either a same code result or a different code result, and in particular,
         a. determining the comparison result to be the same code result when the carrier-of-record code is the same as the preferred carrier code, the same code result indicating that the preferred carrier is a carrier-of-record associated with the carrier-of-record code, or
         b. determining the comparison result to be the different code result when the carrier-of-record code is different from the preferred carrier code, the different code result indicating that the preferred carrier is a carrier associated with the preferred carrier code, and
      v. based on the comparison result, creating an accounting record to attribute the communication to the preferred carrier.

5. The method of claim 4, wherein step E(v) further comprises routing the communication to a terminating station through a communications network associated with the preferred carrier.

6. The method of claim 4, further comprising the step of deactivating the indicator with respect to the subscriber's line in response to determining in step E(iv) that the comparison result is the same code result, whereby subsequently received communications are attributed to the preferred carrier without the execution of steps D–E.

7. In an intelligent switched telecommunications network, a method for attributing a communication to a preferred carrier for accounting purposes, comprising the steps of:
   A. receiving a carrier change request, the carrier change request indicating a change in a subscriber's choice of the preferred carrier with respect to telecommunication services on a subscriber's line;
   B. entering a preferred carrier code in association with the subscriber's line into an interim carrier database, the preferred carrier code corresponding to the subscriber's choice of the preferred carrier;
   C. in response to entering the preferred carrier code into the interim carrier database, activating an indicator with respect to the subscriber's line;
   D. in response to receiving a communication on the subscriber's line, detecting the indicator with respect to the subscriber's line;
   E. in response to detecting the indicator, i. obtaining a carrier-of-record code associated with the subscriber's line,
ii. obtaining the preferred carrier code associated with the subscriber's line,
iii. comparing the carrier-of-record code with the preferred carrier code for a comparison result, and
iv. determining the comparison result, the comparison result being either a same code result or a different code result, and in particular,
   a. determining the comparison result to be the same code result when the carrier-of-record code is the same as the preferred carrier code, the same code result indicating that the preferred carrier is a carrier-of-record associated with the carrier-of-record code, or
   b. determining the comparison result to be the different code result when the carrier-of-record code is different from the preferred carrier code, the different code result indicating that the preferred carrier is a carrier associated with the preferred carrier code, and
V. based on the comparison result, routing the communication to a terminating station through a communications network associated with the preferred carrier.

8. The method of claim 7, further comprising the step of deactivating the indicator with respect to the subscriber's line in response to determining in step E(iv) that the comparison result is the same code result, whereby subsequently received communications are routed to the terminating station through the communications network associated with the preferred carrier without the execution of steps D–E.

9. In an intelligent switched telecommunications network, a system for attributing a communication on a subscriber's line to a preferred carrier for accounting purposes, comprising:

an interim carrier database including a preferred carrier code associated with the subscriber's line;

a network element functionally connected to the interim carrier database, the network element being operative to receive a communication on the subscriber's line, and the network element including a carrier-of-record code associated with the subscriber's line, an indicator also associated with the subscriber's line, the indicator indicating that in response to receipt of the communication on the subscriber's line that a comparison must be made between the preferred carrier code and the carrier-of-record code for a comparison result, and an attributor for attributing the communication to the preferred carrier for accounting purposes based on the comparison result; and a comparator functionally connected to the interim carrier database and/or to the network element, the comparator being operative to make a comparison between the preferred carrier code and the carrier-of-record code for the comparison result, the comparison result being either a same code result or a different code result, the comparison result being the same code result when the carrier-of-record code is the same as the preferred carrier code, the same code result indicating that the preferred carrier is a carrier-of-record associated with the carrier-of-record code, and the comparison result being the different code result when the carrier-of-record code is different from the preferred carrier code, the different code result indicating that the preferred carrier is a carrier associated with the preferred carrier code, and the comparator being further operative to provide the comparison result to the network element.

10. The system of claim 9, wherein the network element is further operative to route the communication to a terminating station through a communications network associated with the preferred carrier based on the comparison result.

11. In an intelligent switched telecommunications network, a system for routing a communication received on a subscriber's line through a communications network associated with a preferred carrier, comprising:

an interim carrier database including a preferred carrier code associated with the subscriber's line;

a network element functionally connected to the interim carrier database, the network element being operative to receive a communication on the subscriber's line, and the network element including a carrier-of-record code associated with the subscriber's line, and an indicator also associated with the subscriber's line, the indicator indicating that in response to receipt of the communication on the subscriber's line that a comparison must be made between the preferred carrier code and the carrier-of-record code for a comparison result;

a comparator functionally connected to the interim carrier database and/or to the network element, the comparator being operative to make a comparison between the preferred carrier code and the carrier-of-record code for the comparison result, the comparison result being either a same code result or a different code result, the comparison result being the same code result when the carrier-of-record code is the same as the preferred carrier code, the same code result indicating that the preferred carrier is a carrier-of-record associated with the carrier-of-record code, and the comparison result being the different code result when the carrier-of-record code is different from the preferred carrier code, the different code result indicating that the preferred carrier is a carrier associated with the preferred carrier code, and the comparator being further operative to provide the comparison result to the network element; and the network element being further operative to route the communication to a terminating station through a communications network associated with the preferred carrier based on the comparison result.

12. The system of claim 11, wherein the network element is further operative to remove the indicator associated with the subscriber's line when the comparison result from the comparator is the same code result, whereby subsequently received communications are routed to the terminating station through the communications network associated with the preferred carrier without the comparison between the preferred carrier code and the carrier-of-record code.

* * * * *